US011172258B1

(12) United States Patent
Tamersoy et al.

(10) Patent No.: US 11,172,258 B1
(45) Date of Patent: Nov. 9, 2021

(54) PROTECTING AGAINST AN IMPERSONATION SCAM IN A LIVE VIDEO STREAM

(71) Applicant: NortonLifeLock Inc., Tempe, AZ (US)

(72) Inventors: Acar Tamersoy, Culver City, CA (US); Kevin Alejandro Roundy, El Segundo, CA (US); Daniel Kats, Culver City, CA (US); Platon Kotzias, Pozuelo de Alarcon (ES)

(73) Assignee: NORTONLIFELOCK INC., Tempe, AZ (US)

( * ) Notice: Subject to any disclaimer, the term of this patent is extended or adjusted under 35 U.S.C. 154(b) by 0 days.

(21) Appl. No.: 17/158,892

(22) Filed: Jan. 26, 2021

(51) Int. Cl.
*H04N 21/454* (2011.01)
*G06K 9/00* (2006.01)
(Continued)

(52) U.S. Cl.
CPC ....... *H04N 21/454* (2013.01); *G06K 9/00744* (2013.01); *G06K 9/6256* (2013.01);
(Continued)

(58) Field of Classification Search
CPC ............... H04N 21/454; H04N 21/437; H04N 21/2187; H04N 21/44008; H04N 21/4665; G06K 9/00744; G06K 9/6256
See application file for complete search history.

(56) References Cited

U.S. PATENT DOCUMENTS 8,897,484 B1 * 11/2014 Fredinburg ......... G06F 21/6245
382/100

2014/0343943 A1 * 11/2014 Al-Telmissani ........ G06F 21/32
704/246
2020/0107050 A1 * 4/2020 Peng ................... H04L 61/2007

FOREIGN PATENT DOCUMENTS

CN 109104615 A * 12/2018
CN 110348372 A * 10/2019
(Continued)

OTHER PUBLICATIONS

Yeboah-Boateng, E. O., & Amanor, P. M; "Phishing, SMiShing & Vishing: An Assessment of Threats against Mobile Devices"; Journal of Emerging Trends in Computing and Information Sciences; Apr. 2014; vol. 5, No. 4; pp. 297-307.
(Continued)

*Primary Examiner* — Nicholas T Corbo
(74) *Attorney, Agent, or Firm* — Maschoff Brennan (57) ABSTRACT

Protecting against an impersonation scam in a live video stream. In some embodiments, a method may include periodically extracting and storing signature features from verified video streams of verified streamers, identifying an unverified live video stream of an unverified streamer being viewed by one or more users, extracting and storing signature features from the unverified live video stream, computing overall distance scores between the signature features of the unverified live video stream and the signature features of the verified video streams, determining whether the unverified streamer is impersonating one or more of the verified streamers by determining whether one or more of the overall distance scores are less than a distance threshold, determining whether one or more text signature features of the unverified live video stream include an impersonation scam, and performing a remedial action to protect the one or more users from the impersonation scam.

20 Claims, 5 Drawing Sheets

(51) Int. Cl.
  *G06K 9/62* (2006.01)
  *H04N 21/44* (2011.01)
  *H04N 21/437* (2011.01)
  *H04N 21/466* (2011.01)
  *H04N 21/2187* (2011.01)

(52) U.S. Cl.
  CPC ....... *H04N 21/2187* (2013.01); *H04N 21/437* (2013.01); *H04N 21/44008* (2013.01); *H04N 21/4665* (2013.01); *G06K 2209/01* (2013.01)

(56) References Cited

FOREIGN PATENT DOCUMENTS

| CN | 111355970 A | * | 6/2020 |
| CN | 109104615 B | * | 9/2020 |
| CN | 111708999 A | * | 9/2020 |

OTHER PUBLICATIONS

Kang, A., Lee, J. D., Kang, W. M., Barolli, L., & Park, J. H.; "Security Considerations for Smart Phone Smishing Attacks"; In Advances in Computer Science and its Applications; Jan. 2014; pp. 467-473.

Joo, J. W., Moon, S. Y., Singh, S., & Park, J. H. (2017). S-Detector: an enhanced security model for detecting Smishing attack for mobile computing. Telecommunication Systems, 66(1), pp. 29-38.

Medvet, E., Kirda, E., & Kruegel, C.; "Visual-similarity-based phishing detection. In Proceedings of the 4th international conference on Security and privacy in communication networks"; Sep. 2008; (pp. 1-6).

Jain, A. K., & Gupta, B. B.; "Phishing detection: Analysis of visual similarity based approaches"; Security and Communication Networks; National Institute of Technology; Jan. 10, 2017; 21 pages.

Hara, M., Yamada, A., & Miyake, Y.; "Visual similarity-Based Phishing Detection without Victim Site Information."; In 2009 IEEE Symposium on Computational Intelligence in Cyber Security; Mar. 2009; pp. 30-36.

Kharraz, A., Robertson, W., & Kirda, E. (May 2018). Surveylance: Automatically detecting online survey scams. In 2018 IEEE Symposium on Security and Privacy (SP) (pp. 70-86). IEEE.

dexerto.com; "Fake s1mple, shroud & Stewie2K CSGO streams are still seaming on Twitch"; Webpage located at: https://www.dexerto.com/csgo/csgo-community-angered-as-twitch-fails-to-stop-impersonation-scammers-1314963 accessed on Jan. 26, 2021; 3 pages.

Jang-Jaccard, J., & Nepal, S.; "A Survey of Emerging Threats in Cybersecurity"; Journal of Computer and System Sciences, 80(5), Feb. 10, 2014; pp. 973-993.

AFKGAMING.com; Aditya Singh Rawat; "Twitch Scammers have started Impersonating Simple after his Ban from the Platform"; Webpage located at: https://afkg-aming.com/articles/csgo/News/2917-Twitch-Scammers-have-started-Impersonating-S1mple-after-his-Ban-from-the-Platform ; Dec. 6, 2019; accessed on Jan. 26, 2021; 10 pages.

KOTAKU.com; Nathan Grayson; "Scammers Are Impersonating Popular Twitch Streamers"; Webpage located at: https://kotaku.com/scammers-are-impersonating-popular-twitch-streamers-1840326738 ; Dec. 9, 2019, accessed on Jan. 26, 2021; 5 pages.

ccn.com; Jasmine Henry; "Twitch Scammers Impersonate Banned CS:GO Pro; Mixer Move Next?"; Webpage located at: https://www.ccn.com/twitch-scammers-banned-csgo-pro-mixer-move/; Sep. 23, 2020; accessed on Jan. 26, 2021; 2 pages.

ccn.com; Jasmine Henry; "Twitches Fastest Growing Channel Reveals Major Hidden Bot Menace"; Webpage located at: m. https://www.ccn.com/twitchs-bot-menace/; Sep. 18, 2019; accessed on Jan. 26, 2021; 2 pages.

UCI Machine Learning Repository: Center for Machine Learning and Intelligent Systems; "SMS Spam Collection Data Set"; Webpage located at: https://archive.ics.uci.edu/ml/datasets/SMS+Spam+Collection ; Jun. 22, 2012; accessed on Jan. 26, 2021; 1 page.

\* cited by examiner

PROTECTING AGAINST AN IMPERSONATION SCAM IN A LIVE VIDEO STREAM

BACKGROUND

Live video streaming platforms, such as YouTube Live, Twitch, YouTube Gaming, and Facebook Gaming, are becoming increasingly popular. This popularity has led an increasing number of performers offering live video streams (known as "streamers") depicting various activities. Some popular streamers are sponsored by a business or businesses, sell goods and/or services on their live video streams, and/or accept donations from fans, resulting in live video streams becoming increasingly lucrative for many streamers. Streaming is even treated as a part-time or full-time job for some streamers.

Unfortunately, the lucrative nature of streaming platforms has attracted malicious streamers (e.g., attackers) whose goal is to leverage the reach of popular streamers by impersonating them to scam unsuspecting users in malicious actions known as impersonation scams. It can be very difficult for streaming platforms and/or users to quickly detect impersonation scams of malicious streamers because malicious streamers are increasingly sophisticated at making their live video streams appear to be the legitimate video streams of legitimate streamers. The inability of streaming platforms and/or users to quickly detect impersonation scams has resulted in an increasing number of users being scammed by malicious streamers. This problem is further exacerbated by the fact that the user demographics on streaming platforms tend to be skewed toward younger users who are generally more susceptible to being deceived by impersonation scams.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for protecting against an impersonation scam in a live video stream may be performed, at least in part, by a computing device including one or more processors. The method may include periodically extracting and storing signature features from verified video streams of verified streamers. The method may also include identifying an unverified live video stream of an unverified streamer being viewed by one or more users. The method may further include extracting and storing signature features from the unverified live video stream. The method may also include computing overall distance scores between the signature features of the unverified live video stream and the signature features of the verified video streams. The method may further include determining whether the unverified streamer is impersonating one or more of the verified streamers by determining whether one or more of the overall distance scores are less than a distance threshold. The method may also include, in response to determining that the unverified streamer is impersonating one or more of the verified streamers, determining, using a machine learning classifier, whether one or more text signature features of the unverified live video stream include an impersonation scam. The method may further include, in response to determining that the one or more text signature features of the unverified live video stream include the impersonation scam, performing a remedial action to protect the one or more users from the impersonation scam.

In some embodiments, the performing of the remedial action may include sending a security alert to the one or more users regarding the impersonation scam, blocking the one or more users from accessing the unverified live video stream, reporting the impersonation scam to a streaming platform being utilized by the unverified streamer, or some combination thereof.

In some embodiments, the signature features may include the one or more text signature features and one or more image signature features.

In some embodiments, the one or more text signature features may include text overlaying video in the verified and unverified video streams, text included in a separate chat that is presented separately from the video in the verified and unverified video streams, or some combination thereof.

In some embodiments, the machine learning classifier may include a logistic regression machine learning classifier, and the computer-implemented method further comprises periodically training the logistic regression machine learning classifier using labeled training data.

In some embodiments, the verified and unverified video streams may include video game video streams. In these embodiments, the impersonation scam may include a giveaway impersonation scam where a false giveaway is offered as an incentive for the one or more users to select a malicious link.

In some embodiments, one or more non-transitory computer-readable media may include one or more computer-readable instructions that, when executed by one or more processors of a computing device, cause the computing device to perform a method for protecting against an impersonation scam in a live video stream.

In some embodiments, a server device may include one or more processors and one or more non-transitory computer-readable media. The one or more non-transitory computer-readable media may include one or more computer-readable instructions that, when executed by the one or more processors, cause the server device to perform a method for protecting against an impersonation scam in a live video stream.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Live video streaming platforms are increasingly popular, resulting in live video streams becoming increasingly lucrative for many popular streamers. Unfortunately, the lucrative nature of streaming platforms has attracted malicious streamers whose goal is to leverage the reach of popular streamers by impersonating them to scam unsuspecting users using impersonation scams. It can be very difficult for streaming platforms and/or users to quickly detect impersonation scams because malicious streamers are increasingly sophisticated at making their live video streams appear to be the legitimate video streams of legitimate streamers.

For example, a live video stream on the streaming platform Twitch may involve a streamer broadcasting content in a channel to viewers. The broadcasted content may be a video game live video stream, which may include video of the streamer playing a video game. A simple but important metric that defines a streamer's popularity is the active viewer count of their channel. Streamers may engage in different activities to increase their viewer counts, such as legitimate giveaways where the streamer offers a prize (e.g., a gift card, a free product, game-related virtual of physical equipment, etc.) to their viewers. Often there are conditions a user must satisfy to be qualified to win the prize, such as being a subscriber of the channel. In this context, some malicious streamers have impersonated legitimate streamers in a giveaway impersonation scam. This giveaway impersonation scam may include a malicious streamer recording a video stream of a popular legitimate streamer using screen capture software, and then creating a fake streaming channel that is similar to that of the legitimate streamer (e.g., using the same avatar, similar channel name, similar channel summary, similar video, etc. of the legitimate streamer). For example, where a legitimate streamer has a legitimate channel name of "simple," a malicious streamer may create a fake channel with a channel name of "simple." Once the fake channel is created, the malicious streamer may start streaming the previously captured video stream on the fake channel, and put a text overlay on the streamed content, and/or may put text in the chat that accompanies the video stream, to announce a bogus giveaway. The announcement may be intended to lure users to visit a malicious link where the malicious user can cause some malicious action to take place, such as stealing personal information entered by the user (e.g., streaming platform credentials, bank account information, etc.), or downloading malware to the user's computing device, as the user attempts to become eligible for the giveaway.

Thus, the inability of streaming platform and/or users to quickly detect impersonation scams has resulted in an increasing number of users, especially highly susceptible younger users, being scammed by malicious streamers.

Some embodiments disclosed herein may protect against an impersonation scam in a live video stream. In some embodiments, a security app may periodically extract and store signature features from verified video streams of verified streamers on a video platform. Then, once an unverified live video stream of an unverified streamer begins to be viewed one or more users, the security app may extract and store signature features from the unverified live video stream, and compute overall distance scores between the signature features of the unverified live video stream and the signature features of the verified video streams. In the event that one or more of the overall distance scores are less than a distance threshold, the security app may determine that the unverified streamer is impersonating one or more of the verified streamers. Then, the security app may determine that one or more text signature features of the unverified live video stream include an impersonation scam and, in response, may perform a remedial action to protect the one or more users from the impersonation scam. These remedial action may include, for example, sending a security alert to the one or more users regarding the impersonation scam (e.g., to warn the one or more users against clicking on any potentially malicious link), blocking the one or more users from accessing the unverified live video stream (e.g., by blocking network access to the unverified live video stream on the user's device), reporting the impersonation scam to a streaming platform being utilized by the unverified streamer (e.g., to enable the streaming platform to cancel the streaming channel being used by the malicious streamer), one or more other remedial actions, or some combination thereof.

Thus, some embodiments may make the relatively quick detection of impersonation scams more likely in live video streams, even where malicious streamers are sophisticated and have made their live video streams appear to be the legitimate video streams of legitimate streamers, but with malicious links to lure unsuspecting users. Thus, some embodiments may help protect users, especially highly susceptible younger users, from being scammed by malicious streamers.

Figure 1:
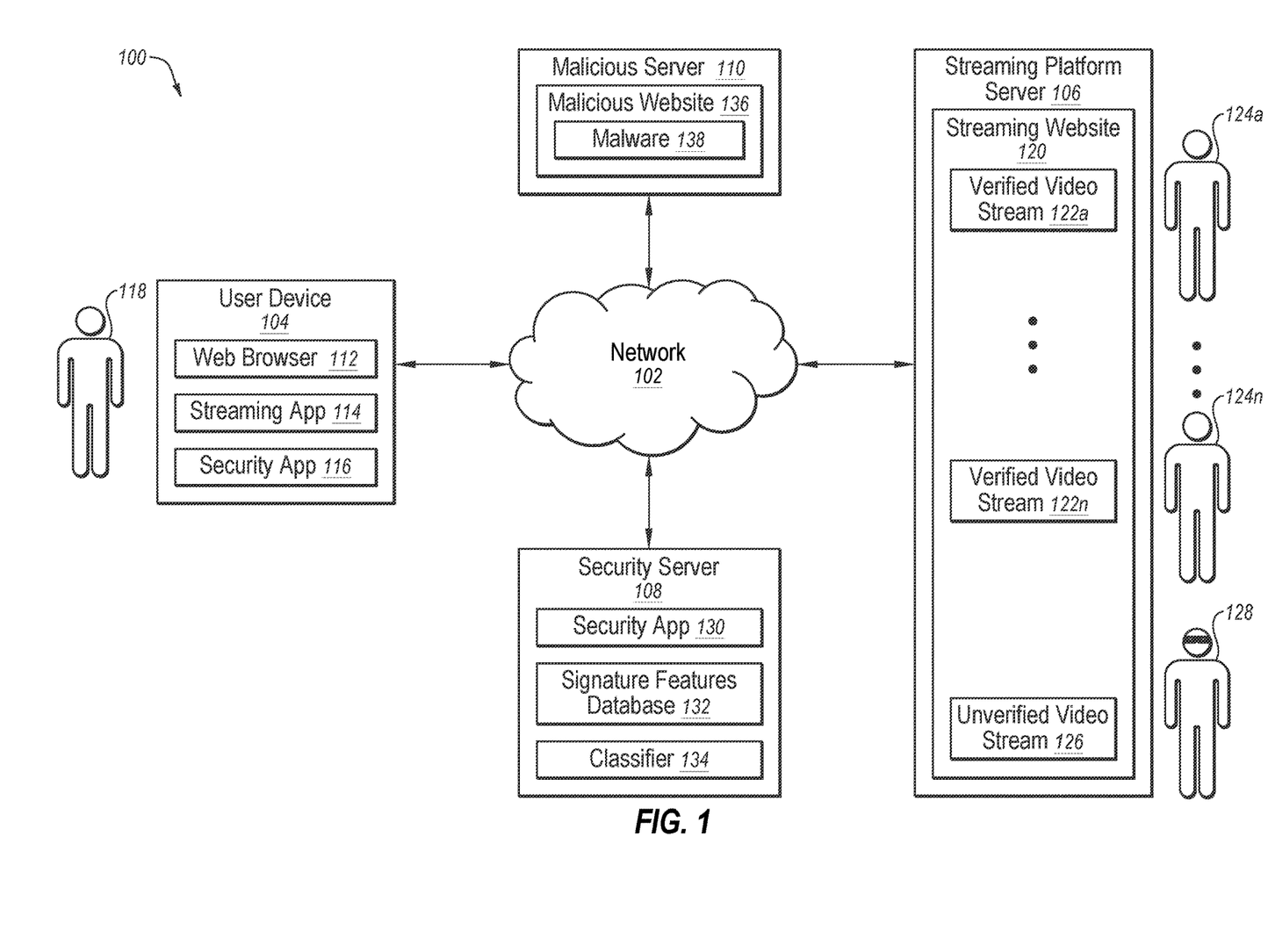
FIG. 1 illustrates an example system configured for protecting against an impersonation scam in a live video stream.

Turning to the figures, FIG. 1 illustrates an example system 100 configured for protecting against an impersonation scam in a live video stream. The system 100 may include a network 102, a user device 104, a streaming platform server 106, a security server 108, and a malicious server 110.

In some embodiments, the network 102 may be configured to communicatively couple the devices and servers in the system 100 to one another, as well as to other network devices and other networks. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), a cellular network, the Internet, or some combination thereof.

Figure 5:
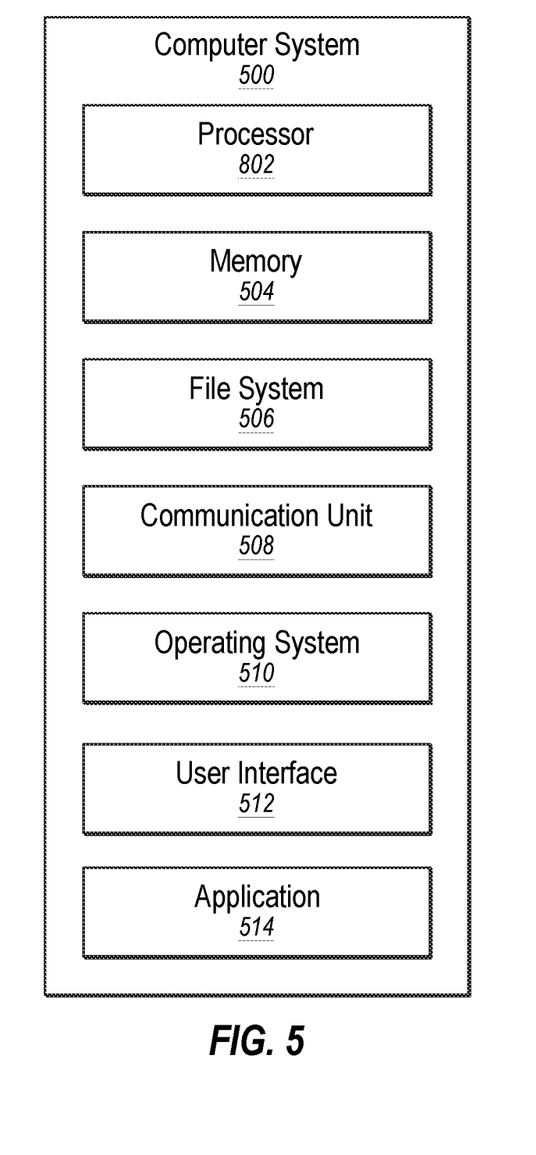
FIG. 5 illustrates an example computer system that may be employed in for protecting against an impersonation scam in a live video stream.

In some embodiments, the user device may be any computer system capable of communicating over the network 102 and capable of running a web browser 112 and/or a streaming app 114 (e.g., a dedicated app of a video streaming platform such as YouTube Live, Twitch, YouTube Gaming, or Facebook Gaming), examples of which are disclosed herein in connection with the computer system 500 of FIG. 5. The user device 104 may further run a security app 116, which may function in connection with the security server 108, to protect a user 118 of the user device 104 from an impersonation scam in a live video stream that is streaming from the streaming platform server 106. In some embodiments, the security app 116 may be associated with, or integrated into, the web browser 112 and/or the streaming app 114, such as where the security app is a browser or app plugin/extension associated with the web browser 112 and/or the streaming app 114, or is built into the web browser 112 and/or the streaming app 114.

In some embodiments, the streaming platform server 106 may be any computer system capable of communicating over the network 102 and capable of streaming live and/or archived video streams, examples of which are disclosed herein in connection with the computer system 500 of FIG. 5. The streaming platform server 106 may host a streaming website 120 (or other interfaces such as an app interface) that is capable of streaming multiple live and/or archived video streams. In some embodiments, the video streams that are streamed from the streaming platform server 106 may be verified or unverified. A verified video stream may be a video stream that has been authenticated as legitimate from a known source, while an unverified video stream may not yet have been authenticated as legitimate from a known source. In some embodiments, a verified streamer may have gone through additional steps, beyond the mere creation of a streaming channel, to verify the user's legitimate identity and/or to demonstrate that the streamer is not a malicious streamer. In some embodiments, an unverified streamer may merely create a streaming channel without going through additional steps to verify the user's legitimate identity and/or without demonstrating that the streamer is not a malicious streamer. For example, the video streams that are streamed from the streaming website 120 may include verified video streams 122a-122n that correspond to verified streamers 124a-124n, as well as an unverified video stream 126 that corresponds to an unverified streamer 128.

In some embodiments, the security server 108 may be any computer system capable of communicating over the network 102 and capable of executing a security app 130, examples of which are disclosed herein in connection with the computer system 500 of FIG. 5. The security app 130 may be configured to implement one or more actions of the methods disclosed herein. For example, the security app 130 may be configured to periodically extract signature features from the verified video streams 122a-122n of the verified streamers 124a-124n and store these signature features in a signature features database 132. Then, once the unverified video stream 126 of the unverified streamer 128 begins to be viewed by one or more users, such as by the user 118 via the web browser 112 or the streaming app 114, the security app 130 may extract signature features from the unverified video stream 126 and store these signature features in the signature features database 132. Then, the security app 130 may compute overall distance scores between the signature features of the unverified video stream 126 and the signature features of the verified video streams 122a-122n. In the event that one or more of the overall distance scores are less than a distance threshold, the security app 130 may determine that the unverified streamer 128 is impersonating one or more of the verified streamers 124a-124n. Then, the security app 130 may determine that one or more text signature features of the unverified video stream 126 include an impersonation scam. This may include the security app 130 employing a classifier 134, which may be a machine learning classifier that has been trained to recognize impersonation scams. In response, the security app 130 may perform a remedial action to protect the one or more users, such as the user 118, from the impersonation scam. These remedial actions may include, for example, sending a security alert to the user 118 regarding the impersonation scam (e.g., to warn the user 118 against clicking on any potentially malicious link), blocking the user from accessing the unverified video stream 126 (e.g., by blocking network access to the unverified video stream 126 on the user device 104), reporting the impersonation scam to the streaming platform server 106 (e.g., to enable the streaming platform server 106 to cancel the unverified video stream 126—and/or any related streaming channel or account—from being used by the unverified streamer 128), one or more other remedial actions, or some combination thereof. It is understood that any of the actions performed by the security app 130 may be performed in connection with, or instead by, the security app 116. It is further understood that the security app 130 and/or the security app 116 may be running on another device or on other devices, such as on the streaming platform server 106.

In some embodiments, the malicious server 110 may be any computer system capable of communicating over the network 102 and capable of hosting malicious content, examples of which are disclosed herein in connection with the computer system 500 of FIG. 5. The malicious server may host a malicious website 136, which may be linked to by a malicious streamer during an impersonation scam, such that when the link presented to a user (e.g., the user 118) is selected (e.g., clicked on), the user 118 may be taken to the malicious website 136. The malicious website 136 may be employed in any malicious manner, such as to steal personal information entered by the user 118 (e.g., streaming platform credentials, bank account information, etc.), or to download malware 138 to the user device 104, such as when the user 118 attempts to become eligible for a giveaway offered by the malicious user during a giveaway impersonation scam.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
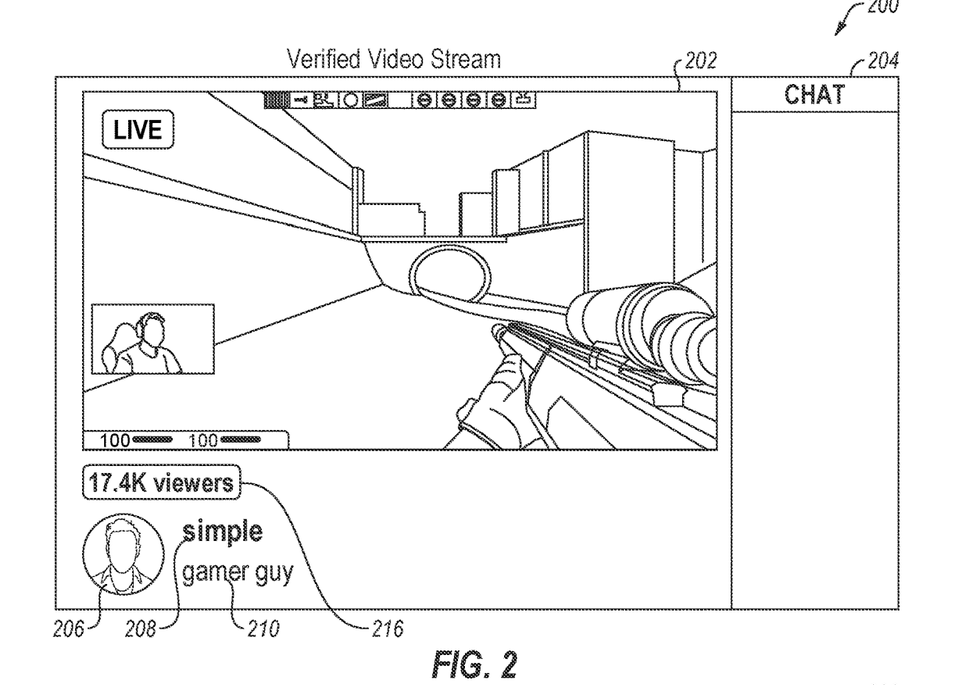
FIG. 2 illustrates a verified video stream.
Figure 3:
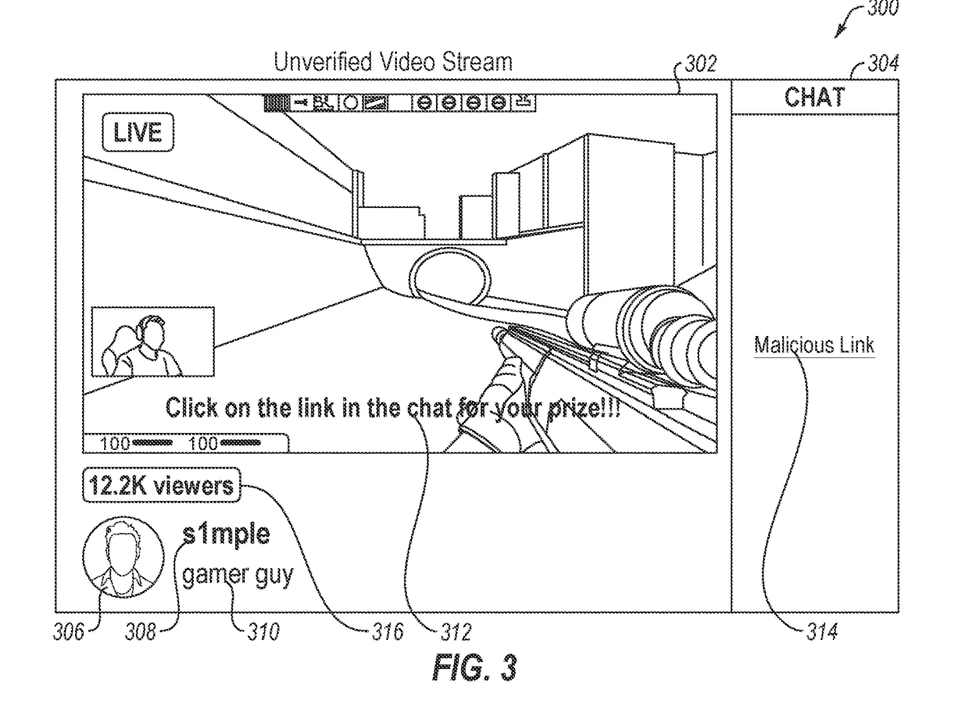
FIG. 3 illustrates an unverified video stream.

FIG. 2 illustrates a verified video stream 200 and FIG. 3 illustrates an unverified video stream 300. As disclosed in FIGS. 2 and 3, the verified and unverified video streams 200 and 300 both include similar features, including videos 202 and 302 and associated chats 204 and 304. The videos 202 and 302 may appear to be deceptively similar or identical, especially where the video 302 is intended to impersonate the video 202. In some cases, the video 302 may be a screen capture of the video 202, rendering the videos 202 and 302 virtually identical. Also, in some cases, the videos 202 and 302 may include picture-in-picture videos, such as where a main video is of a game a streamer is playing, while the picture-in-picture video is video of the actual streamer that is taken using a webcam. The videos 202 and 302 may also include avatars 206 and 306, channel names 208 and 308, channel summaries 210 and 310, and various other text features (such as a false giveaway message 312 overlaying the video 302, as well as sponsor information, viewer counts 216 and 316, subscribers, or most recent donations, etc.), all of which may be deceptively similar or identical.

As disclosed elsewhere herein, various signature features, such as video features, image features, text features, audio features, and other features, may be extracted from the verified and unverified video stream 200 and 300, and then used to automatically determine whether the unverified video stream 300 is attempting to impersonate the verified video stream 200. Further, text features (such as the false giveaway message 312 overlaying the video 302) in the unverified video stream 300 may be used to automatically determine that an impersonation scam is included in the unverified video stream 300, such as a giveaway impersonation scam represented by the false giveaway message 312 and the associated malicious link 314 in the chat 304, which may link to a malicious website, such as the malicious website 136 of FIG. 1.

Modifications, additions, or omissions may be made to the verified and unverified video streams 200 and 300 without departing from the scope of the present disclosure. For example, in some embodiments, the verified and unverified video streams 200 and 300 may depict content other than video game content, such as educational content, entertainment content, interactive content, or any other video content. Further, the verified and unverified video streams 200 and 300 may be live and/or archived video streams. Also, the verified and unverified video streams 200 and 300 may not necessarily include the chats 204 and 304, in which case the malicious link 314 may be presented directly in the video 302. Further, the verified and unverified video streams 200 and 300 may include additional components similar to the components illustrated in FIGS. 2 and 3 that each may be configured similarly to the components illustrated in FIGS. 2 and 3.

Figure 4A:
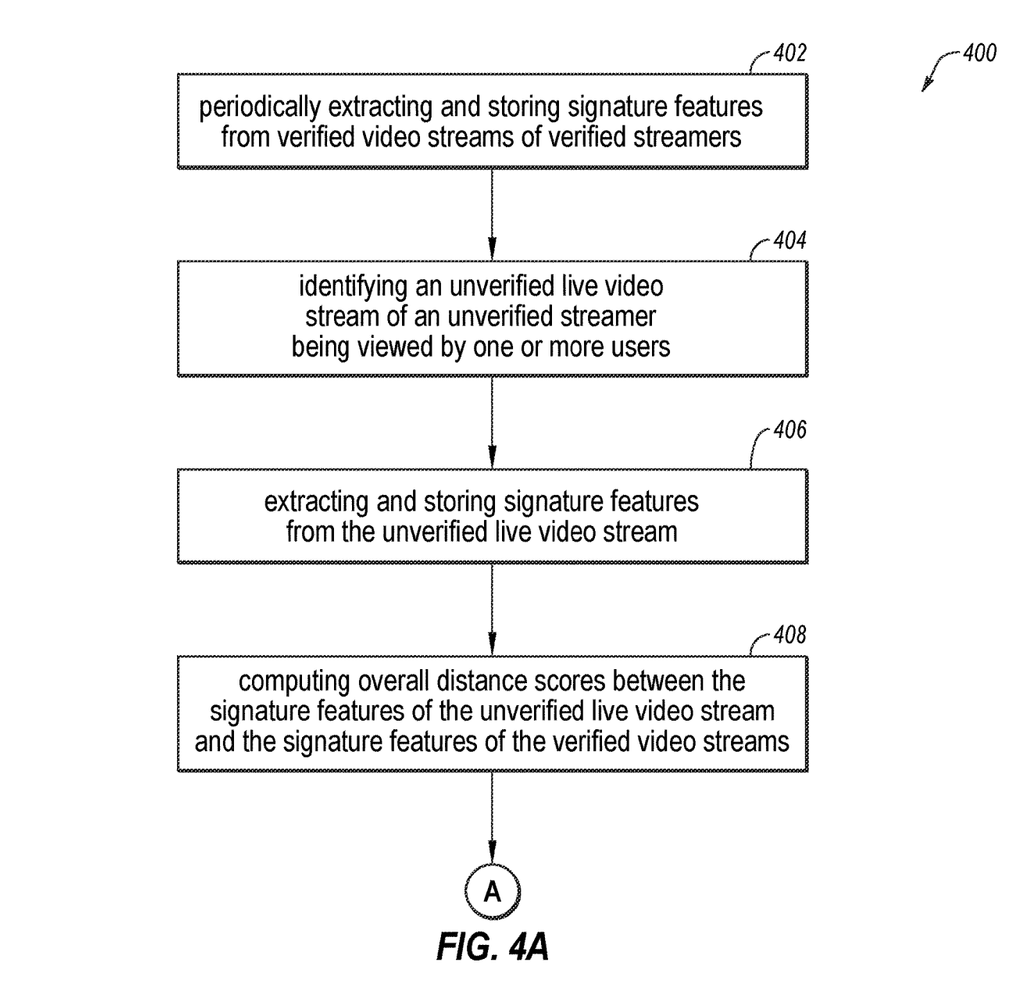
FIGS. 4A-4B are a flowchart of an example method for protecting against an impersonation scam in a live video stream.
Figure 4B:
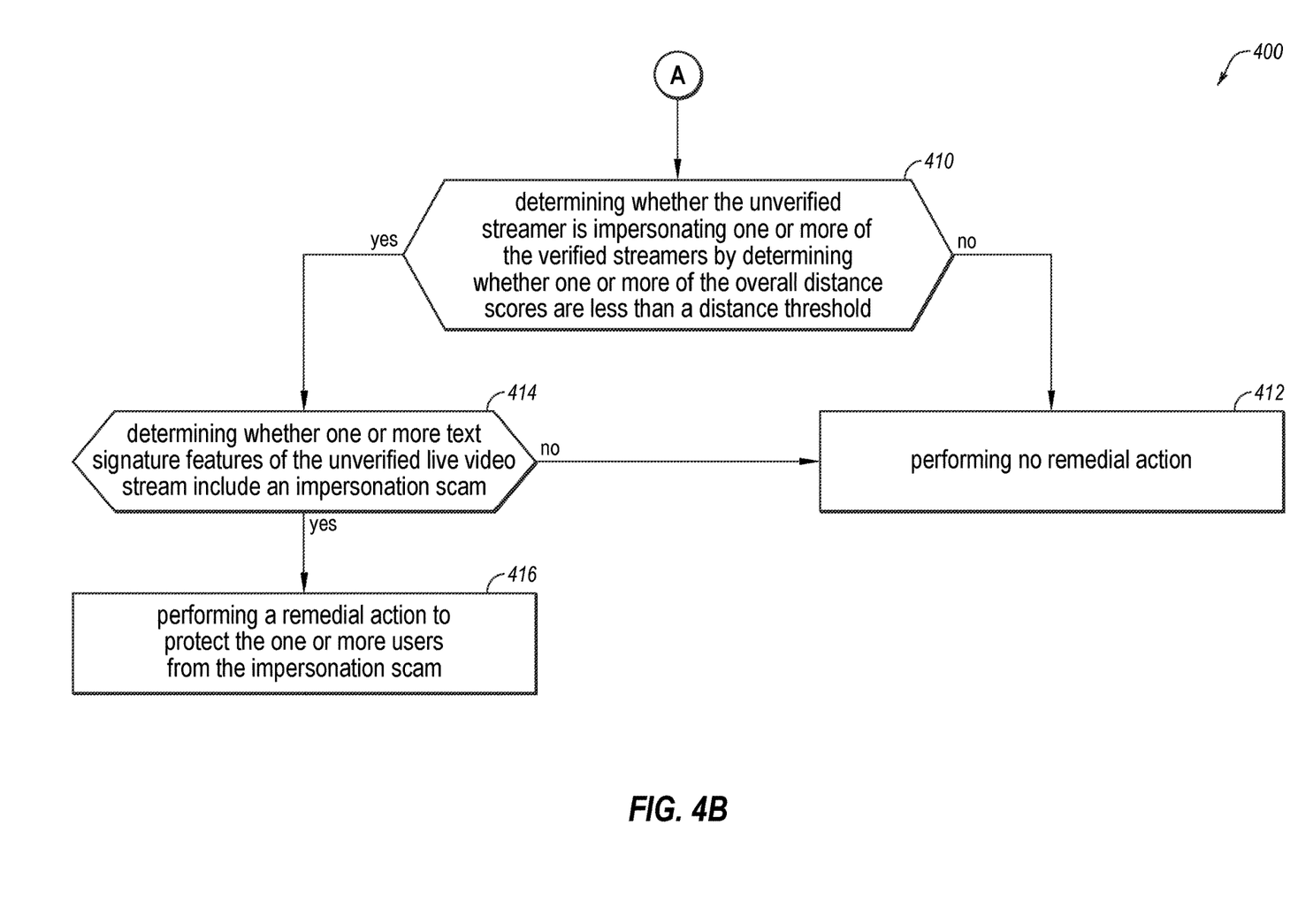

FIGS. 4A-4B are a flowchart of an example method 400 for protecting against an impersonation scam in a live video stream. The method 400 may be performed, in some embodiments, by one or more apps, devices, or systems, such as by the security apps 116 and 130 of FIG. 1, or some other app(s), or some combination thereof. In these and other embodiments, the method 400 may be performed by one or more processors based on one or more computer-readable instructions stored on one or more non-transitory computer-readable media. The method 400 will now be described in connection with FIGS. 1-4B.

The method 400 may include, at action 402, periodically extracting and storing signature features from verified video streams of verified streamers. For example, the security app 130 may periodically extract signature features from the verified video streams 122a-122n of the verified streamers 124a-124n and store the signature features in the signature features database 132. In some embodiments, these extracted signature features may be stored in a signature features matrix in the signature features database 132 similar to the following:

| $f_1$: Channel name | $f_2$: Channel summary text | $f_3$: Streamer's avatar | $f_4$: 2D Haar transform of streamer's webcam | $f_5$: Textual content extracted from screen using OCR |
|---|---|---|---|---|
| $t_1$ | | | | |
| ... | | | | |
| $t_n$ | | | | |

In this signature features matrix, the signature features $f_1$-$f_5$ represent a vector of features that include the channel name, channel summary text, streamer's avatar, a 2D Haar transform of the streamer's webcam, and textual content extracted from screen using OCR. These features $f_1$-$f_5$ are stored for times $t_1$-$t_n$. Thus, at action 402, a library of signature features of the verified video streams 122a-122n can be built that can later be compared against unverified live video streams to identify any impersonation scams in the unverified live video streams.

The method 400 may include, at action 404, identifying an unverified live video stream of an unverified streamer being viewed by one or more users. For example, the security app 130 and/or the security app 116 may identify the unverified video stream 126 of the unverified streamer 128 being viewed by the user 118 on the web browser 112 or on the streaming app 114 of the user device 104. The unverified video stream 126 may be identified at action 404, for example, due to one or more protected users (e.g., the user 118) viewing the unverified video stream 126, or due to some threshold number of users (e.g., 10,000 users) viewing the unverified video stream 126. The security app 130 may perform the action 404 by periodically crawling the website 120 (e.g., every 10 minutes, 15 minutes, etc.) to get a list of unverified video streams (e.g., channels) with viewer counts above the threshold number. In some embodiments, unverified video streams with high viewer counts may be automatically pushed to the main page of the website of a streaming platform, resulting in viewer counts snowballing even higher, and potentially resulting in a snowballing of damage to more and more users where the unverified video stream represents an impersonation scam.

The method 400 may include, at action 406, extracting and storing signature features from the unverified live video stream. In both action 402 and action 406, the signature features may include one or more text signature features, one or more image signature features, one or more video signature features, one or more audio signature features, or some combination thereof. Also, in both action 402 and action 406, the one or more text signature features may include text overlaying video in the verified and unverified video streams, text included in a separate chat that is presented separately from the video in the verified and unverified video streams, or some combination thereof. For example, the security app 130 may extract signature features from the unverified video stream 126 of the unverified streamers 128 and store the signature features in the signature features database 132. These signature features may include one or more text signature features (such as the channel names 208 and 308, the channel summaries 210 and 310, the false giveaway message 312 overlaying the video 302, and text included in the chats 204 and 304), one or more image signature features (such as the avatars 206 and 306), one or more video signature features (such as the videos 202 and 302), one or more audio signature features (such as any audio accompanying the verified and unverified video streams 200 and 300), or some combination thereof.

The method 400 may include, at action 408, computing overall distance scores between the signature features of the unverified live video stream and the signature features of the verified video streams. For example, the security app 130 may compute overall distance scores between the signature features of the unverified video stream 126 and the signature features of the verified video streams 122a-122n. In some embodiments, action 408 may be performed using the following formulas:

$\Sigma d_i * w_i = 0 \rightarrow$ Stream is straight copy, report to streaming platform $0 < \Sigma d_i * w_i <$ threshold $\rightarrow$ Stream needs further investigation where d is the distance between two signature features, and w is a weight given to each signature features to enable more important signature features to be weighted higher, and less important signature features to be weighted lower. In some embodiments, a distance between textual features may be computed using Levenshtein distance. In some embodiments, a distance between image-based features may be computed using Kullback-Leibler-divergence (KL-divergence). Other methods for computing distances between features may alternatively or additionally be employed.

The method 400 may include, at action 410, determining whether the unverified streamer is impersonating one or more of the verified streamers by determining whether one or more of the overall distance scores are less than a distance threshold. If not (no at action 410), the method 400 may proceed to action 412. If so (yes at action 410), the method 400 may proceed to action 414. For example, the security app 130 may determine whether the unverified streamer 128 is impersonating one or more of the verified streamers 124a-124n by determining whether one or more of the overall distance scores are less than a distance threshold.

The method 400 may include, at action 412, performing no remedial action. For example, the security app 130 may perform no remedial action because the unverified streamer 128 was not determined to be impersonating one or more of the verified streamers 124a-124n.

The method 400 may include, at action 414, determining whether one or more text signature features of the unverified live video stream include an impersonation scam. If not (no at action 414), the method 400 may proceed to action 412. If so (yes at action 414), the method 400 may proceed to action 416. In some embodiments, action 414 may performing the determination using a machine learning classifier which has been trained one or more times using labeled training data. In some embodiments, the machine learning classifier may be a logistic regression machine learning classifier. In some embodiments, the verified and unverified video streams comprise video game video streams. In these embodiments, the impersonation scam may include a giveaway impersonation scam where a false giveaway is offered as an incentive for the one or more users to select a malicious link. For example, the security app 130 may employ the classifier 134 to determine whether one or more text signature features of the unverified video stream 126 include an impersonation scam, such as a giveaway impersonation scam, or other impersonation scam. The classifier 134 may be trained, as well as periodically retrained, with labeled data. This labeled data may be labeled data specifically targeted at impersonation scams in video streams, or may be targeted at other types of similar scams such as SMS scams (e.g., from SMS spam datasets) and/or email scams where impersonation also takes place, and where the attacker is also likely to include a small amount of text leading victims to an external website (e.g., "For a free weapon skin giveaway, visit bit.ly/xyz"). Through this training, the classifier 134 can distinguish between benign text and malicious text in video streams.

The method 400 may include, at action 416, performing a remedial action to protect the one or more users from the impersonation scam. In some embodiments, action 416 may include sending a security alert to the one or more users regarding the impersonation scam, blocking the one or more users from accessing the unverified live video stream, reporting the impersonation scam to a streaming platform being utilized by the unverified streamer, or some combination thereof. For example, the security app 130 and/or the security app 116 may perform a remedial action to protect the user 118 from the impersonation scam. The performing of the remedial action may include sending a security alert to the user 118 regarding the impersonation scam (e.g., to warn the user 118 against clicking on the malicious link 314), blocking the user 118 from accessing the unverified video stream 126 (e.g., by blocking network access to the unverified video stream 126 on the user device 104), reporting the impersonation scam to the streaming platform server 106 (e.g., to enable the streaming platform server 106 to cancel the unverified video stream 126—and/or any related streaming channel or account—from being used by the unverified streamer 128), one or more other remedial actions, or some combination thereof.

In some embodiments, the method 400 may be employed to protect against an impersonation scam in a live video stream by making the quick detection of impersonation scams more likely in live video streams, even where malicious streamers are sophisticated and have made their live video streams appear to be the legitimate video streams of legitimate streamers. Thus, the method 400 may help protect users, especially highly susceptible younger users, from being scammed by malicious streamers.

Although the actions of the method 400 are illustrated in FIGS. 4A-4B as discrete actions, various actions may be divided into additional actions, combined into fewer actions, reordered, expanded, or eliminated, depending on the desired implementation. For example, in some embodiments, actions 402, 404, 406, 408, 410, and 416 may be performed without performing action 414. Alternatively, in some embodiments, actions 402, 404, 406, 408, 414, and 416 may be performed without performing action 410. Also, in some embodiments, the actions of the method 400 may be performed on live and/or archived video streams. Further, in some embodiments, the action 416 may be performed by a network administrator or other entity that is different from the entity or entities performing the other actions of the method 400.

FIG. 5 illustrates an example computer system 500 that may be employed in protecting against an impersonation scam in a live video stream. In some embodiments, the computer system 500 may be part of any of the systems or devices described in this disclosure. For example, the computer system 500 may be part of any of the user device 104, the streaming platform server 106, the security server 108, or the malicious server 110 of FIG. 1.

The computer system 500 may include a processor 502, a memory 504, a file system 506, a communication unit 508, an operating system 510, a user interface 512, and an application 514, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 502 may include any suitable special-purpose or general-purpose computer, computing entity, or processing device including various computer hardware or software applications and may be configured to execute instructions stored on any applicable computer-readable storage media. For example, the processor 502 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 502 may interpret and/or execute program instructions and/or process data stored in the memory 504 and/or the file system 506. In some embodiments, the processor 502 may fetch program instructions from the file system 506 and load the program instructions into the memory 504. After the program instructions are loaded into the memory 504, the processor 502 may execute the program instructions. In some embodiments, the instructions may include the processor 502 performing one or more actions of the methods disclosed herein.

The memory 504 and the file system 506 may include computer-readable storage media for carrying or having stored thereon computer-executable instructions or data structures. Such computer-readable storage media may be any available non-transitory media that may be accessed by a general-purpose or special-purpose computer, such as the processor 502. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 502 to perform a certain operation or group of operations, such as one or more actions of the methods disclosed herein. These computer-executable instructions may be included, for example, in the operating system 510, in one or more applications, such as in any of the apps disclosed herein, or in some combination thereof.

The communication unit 508 may include any component, device, system, or combination thereof configured to transmit or receive information over a network, such as the network 102 of FIG. 1. In some embodiments, the communication unit 508 may communicate with other devices at other locations, the same location, or even other components within the same system. For example, the communication unit 508 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a WiMAX device, a cellular communication device, etc.), and/or the like. The communication unit 508 may permit data to be exchanged with a network and/or any other devices or systems, such as those described in the present disclosure.

The operating system 510 may be configured to manage hardware and software resources of the computer system 500 and configured to provide common services for the computer system 500.

The user interface 512 may include any device configured to allow a user to interface with the computer system 500. For example, the user interface 512 may include a display, such as an LCD, LED, or other display, that is configured to present video, text, application user interfaces, and other data as directed by the processor 502. The user interface 512 may further include a mouse, a track pad, a keyboard, a touchscreen, volume controls, other buttons, a speaker, a microphone, a camera, any peripheral device, or other input or output device. The user interface 512 may receive input from a user and provide the input to the processor 502. Similarly, the user interface 512 may present output to a user.

The application 514 may be one or more computer-readable instructions stored on one or more non-transitory computer-readable media, such as the memory 504 or the file system 506, that, when executed by the processor 502, is configured to perform one or more actions of the methods disclosed herein. In some embodiments, the application 514 (e.g., app) may be part of the operating system 510 or may be part of an application of the computer system 500, or may be some combination thereof. In some embodiments, the application 514 may function as any of the apps disclosed herein.

Modifications, additions, or omissions may be made to the computer system 500 without departing from the scope of the present disclosure. For example, although each is illustrated as a single component in FIG. 5, any of the components 502-514 of the computer system 500 may include multiple similar components that function collectively and are communicatively coupled. Further, although illustrated as a single computer system, it is understood that the computer system 500 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 502 of FIG. 5) including various computer hardware or software applications, as discussed in greater detail below. Further, as indicated above, embodiments described herein may be implemented using computer-readable media (e.g., the memory 504 or file system 506 of FIG. 5) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting against an impersonation scam in a live video stream, at least a portion of the method being performed by a computing device comprising one or more processors, the computer-implemented method comprising:
   periodically extracting and storing signature features from verified video streams of verified streamers;
   identifying an unverified live video stream of an unverified streamer being viewed by one or more users;
   extracting and storing signature features from the unverified live video stream;
   computing overall distance scores between the signature features of the unverified live video stream and the signature features of the verified video streams;
   determining whether the unverified streamer is impersonating one or more of the verified streamers by determining whether one or more of the overall distance scores are less than a distance threshold;
   in response to determining that the unverified streamer is impersonating one or more of the verified streamers, determining, using a machine learning classifier, whether one or more text signature features of the unverified live video stream include an impersonation scam; and
   in response to determining that the one or more text signature features of the unverified live video stream include the impersonation scam, performing a remedial action to protect the one or more users from the impersonation scam.

2. The computer-implemented method of claim 1, wherein the performing of the remedial action comprises:
   sending a security alert to the one or more users regarding the impersonation scam;
   blocking the one or more users from accessing the unverified live video stream;
   reporting the impersonation scam to a streaming platform being utilized by the unverified streamer; or
   some combination thereof.

3. The computer-implemented method of claim 1, wherein the signature features comprise:
   the one or more text signature features; and
   one or more image signature features.

4. The computer-implemented method of claim 1, wherein the one or more text signature features comprise:
   text overlaying video in the verified and unverified video streams;
   text included in a separate chat that is presented separately from the video in the verified and unverified video streams; or
   some combination thereof.

5. The computer-implemented method of claim 1, wherein:
   the machine learning classifier comprises a logistic regression machine learning classifier; and
   the computer-implemented method further comprises periodically training the logistic regression machine learning classifier using labeled training data.

6. The computer-implemented method of claim 1, wherein the verified and unverified video streams comprise video game video streams.

7. The computer-implemented method of claim 6, wherein the impersonation scam comprises a giveaway impersonation scam where a false giveaway is offered as an incentive for the one or more users to select a malicious link.

8. One or more non-transitory computer-readable media comprising one or more computer-readable instructions that, when executed by one or more processors of a computing device, cause the computing device to perform a method for protecting against an impersonation scam in a live video stream, the method comprising:
   periodically extracting and storing signature features from verified video streams of verified streamers;
   identifying an unverified live video stream of an unverified streamer being viewed by one or more users;
   extracting and storing signature features from the unverified live video stream;
   computing overall distance scores between the signature features of the unverified live video stream and the signature features of the verified video streams;
   determining whether the unverified streamer is impersonating one or more of the verified streamers by determining whether one or more of the overall distance scores are less than a distance threshold;
   in response to determining that the unverified streamer is impersonating one or more of the verified streamers, determining, using a machine learning classifier, whether one or more text signature features of the unverified live video stream include an impersonation scam; and
   in response to determining that the one or more text signature features of the unverified live video stream include the impersonation scam, performing a remedial action to protect the one or more users from the impersonation scam.

9. The one or more non-transitory computer-readable media of claim 8, wherein the performing of the remedial action comprises:
sending a security alert to the one or more users regarding the impersonation scam;
blocking the one or more users from accessing the unverified live video stream;
reporting the impersonation scam to a streaming platform being utilized by the unverified streamer; or
some combination thereof.

10. The one or more non-transitory computer-readable media of claim 8, wherein the signature features comprise:
the one or more text signature features; and
one or more image signature features.

11. The one or more non-transitory computer-readable media of claim 8, wherein the one or more text signature features comprise:
text overlaying video in the verified and unverified video streams;
text included in a separate chat that is presented separately from the video in the verified and unverified video streams; or
some combination thereof.

12. The one or more non-transitory computer-readable media of claim 8, wherein:
the machine learning classifier comprises a logistic regression machine learning classifier; and
the method further comprises periodically training the logistic regression machine learning classifier using labeled training data.

13. The one or more non-transitory computer-readable media of claim 8, wherein the verified and unverified video streams comprise video game video streams.

14. The one or more non-transitory computer-readable media of claim 13, wherein the impersonation scam comprises a giveaway impersonation scam where a false giveaway is offered as an incentive for the one or more users to select a malicious link.

15. A server device comprising:
one or more processors; and
one or more non-transitory computer-readable media comprising one or more computer-readable instructions that, when executed by the one or more processors, cause the server device to perform a method for protecting against an impersonation scam in a live video stream, the method comprising:
periodically extracting and storing signature features from verified video streams of verified streamers;
identifying an unverified live video stream of an unverified streamer being viewed by one or more users;
extracting and storing signature features from the unverified live video stream;
computing overall distance scores between the signature features of the unverified live video stream and the signature features of the verified video streams;
determining whether the unverified streamer is impersonating one or more of the verified streamers by determining whether one or more of the overall distance scores are less than a distance threshold;
in response to determining that the unverified streamer is impersonating one or more of the verified streamers, determining, using a machine learning classifier, whether one or more text signature features of the unverified live video stream include an impersonation scam; and
in response to determining that the one or more text signature features of the unverified live video stream include the impersonation scam, performing a remedial action to protect the one or more users from the impersonation scam.

16. The server device of claim 15, wherein the performing of the remedial action comprises:
sending a security alert to the one or more users regarding the impersonation scam;
blocking the one or more users from accessing the unverified live video stream;
reporting the impersonation scam to a streaming platform being utilized by the unverified streamer; or
some combination thereof.

17. The server device of claim 15, wherein the signature features comprise:
the one or more text signature features; and
one or more image signature features.

18. The server device of claim 15, wherein the one or more text signature features comprise:
text overlaying video in the verified and unverified video streams;
text included in a separate chat that is presented separately from the video in the verified and unverified video streams; or
some combination thereof.

19. The server device of claim 15, wherein:
the machine learning classifier comprises a logistic regression machine learning classifier; and
the method further comprises periodically training the logistic regression machine learning classifier using labeled training data.

20. The server device of claim 15, wherein:
the verified and unverified video streams comprise video game video streams; and
the impersonation scam comprises a giveaway impersonation scam where a false giveaway is offered as an incentive for the one or more users to select a malicious link.

* * * * *